B. BORDEN.
THREAD CUTTING TOOL.
APPLICATION FILED JAN. 20, 1908.
924,221.
Patented June 8, 1909.
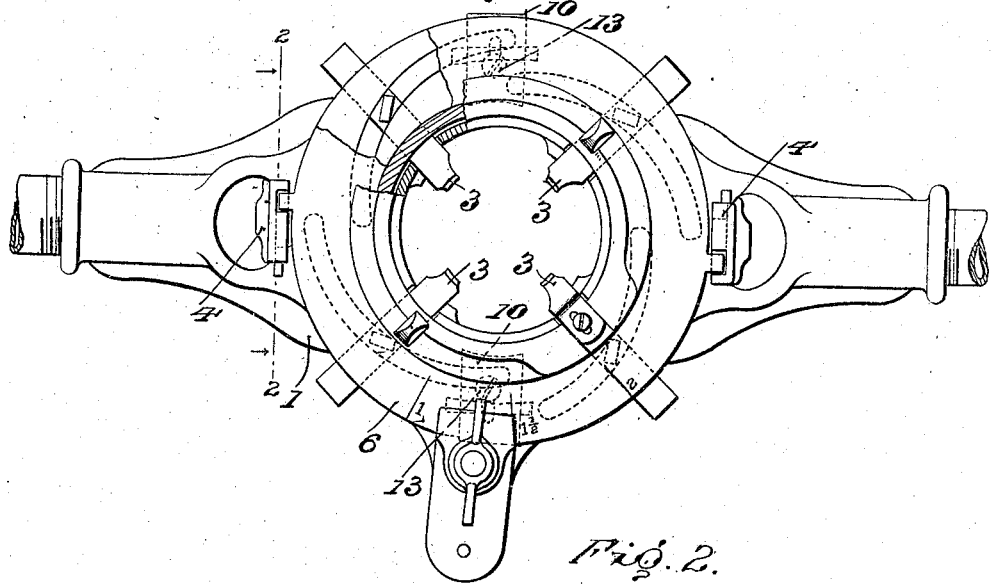
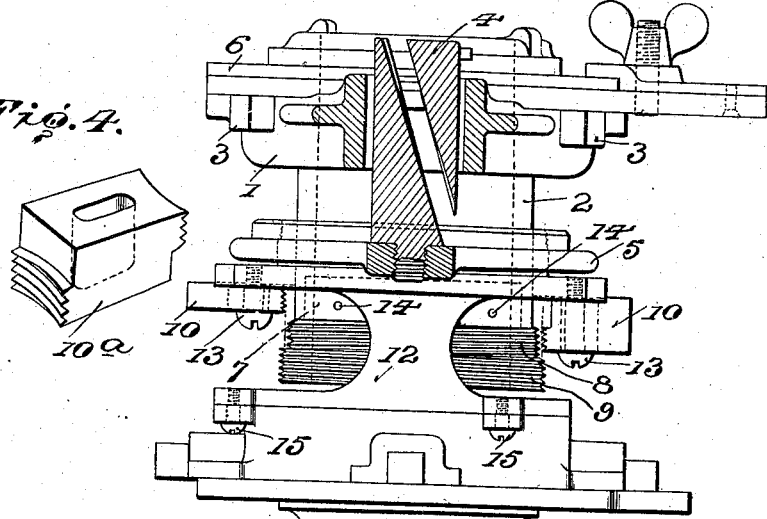
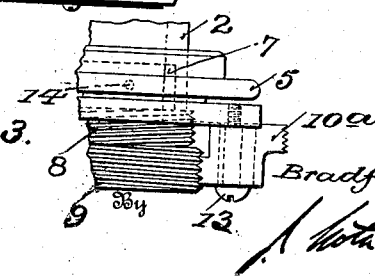
Witnesses
W. A. Williams.
Francis S. Maguire.
Inventor
Bradford Borden
By
Attorney

UNITED STATES PATENT OFFICE.

BRADFORD BORDEN, OF WARREN, OHIO, ASSIGNOR TO THE BORDEN COMPANY, OF WARREN, OHIO, A CORPORATION OF OHIO.

THREAD-CUTTING TOOL.

No. 924,221.      Specification of Letters Patent.      Patented June 8, 1909.

Application filed January 20, 1908. Serial No. 411,705.

*To all whom it may concern:*

Be it known that I, BRADFORD BORDEN, of Warren, in the county of Trumbull and State of Ohio, have invented certain new and useful Improvements in Thread-Cutting Tools; and I do hereby declare the following to be a full, clear, and exact description of the invention, such as will enable others skilled in the art to which it appertains to make and use the same.

The primary object of this invention is to enable both right and left hand threads to be cut by a single tool, and the invention is especially adapted for that class of tools by which taper threads are formed on pipes and the like.

The invention will be hereinafter fully set forth and particularly pointed out in the claims.

In the accompanying drawings, Figure 1 is a plan view of a threading tool in connection with which my improvements may be employed. Fig. 2 is a side view, partly in section. Fig. 3 shows a double feed block. Fig. 4 shows the same detached.

Referring to the drawings, 1 designates the housing; 2 the tubular sleeve extending rearwardly therefrom; 3 the chasers; 4 the posts mounted on a collar 5 and having diagonal guideways with which engage lugs of the chaser-turning plate 6 for effecting the gradual recession of the chasers during the cutting operation. This is a known construction, having heretofore been patented to me or embraced by pending applications for patents.

The tubular sleeve 2 has a smooth exterior, but at its rear end it is counterbored to accommodate the reduced end of a doubly-threaded extension 7, that is to say, this extension forms a leader screw, with a right-hand thread 8 and a left-hand thread 9. Each threaded portion consists of about three or four threads, and with each portion a separate feed block 10 may be caused to engage. These feed blocks may be moved into engagement with and disengaged from their respective screw threads, being held to the work holder 12 by retaining screws 13 passed through slots in the blocks. It is preferable, however, to employ a single feed block, located at one side of the machine, with threads at each end, (as at 10$^a$, Fig. 3) since in the use of two separate blocks there is danger that the operator might fail to properly disengage the block not intended to be used. The leader screw is secured to sleeve 2 by rivets 14 which may be readily removed in the event a new leader screw is needed.

The threads of each portion of the screw are sufficient to start the chasers on the pipe to be threaded, and as the threading operation continues the screw runs off the feed block with which it was in engagement, and the device as a whole feeds itself on the pipe by the grip of the chasers. It is not necessary, therefore, that the leader screw extend over the entire length of the sleeve, but only sufficient to start the chasers on their work. Once this is accomplished the use of leader-screws and blocks is unnecessary, and as the housing travels toward the work holder the chasers will recede, thereby forming a taper thread. That portion of the leader screw extension 7 having the thread 9 is of slightly greater diameter than the threaded portion 8. The work holder 12 is formed in sections united by screws 15 to permit the leader screw extension to be readily secured to or removed from sleeve 2.

I claim as my invention:—

1. A thread cutting tool comprising a housing having a sleeve, chasers mounted in said housing, a leader screw carried by said sleeve at the rear end thereof and having right and left hand threads, a work holder, and means mounted on said work holder having right and left hand threads to engage either thread of the leader screw while starting the engagement between the chasers and the pipe or article to be threaded.

2. A thread cutting tool comprising a housing having a sleeve, chasers mounted in said housing, a leader screw carried by said sleeve at the rear end thereof and having right and left hand threads, a work holder, and a reversible feed block oppositely threaded at its opposite ends for engaging the respective threads of the leader screw.

3. A thread cutting tool comprising a housing having a sleeve, chasers mounted in said housing, a leader screw carried by said sleeve at the rear end thereof and having right and left hand threads, a work holder, and a feed block slidably mounted on said work holder and reversible end for end, said feed block being oppositely threaded on its opposite ends for engaging either thread of the leader screw.

In testimony whereof, I have signed this specification in the presence of two subscribing witnesses.

BRADFORD BORDEN.

Witnesses:
ALBERT E. KNOX,
EDWARD L. MIDDLETON.